United States Patent [19]

Anzelone et al.

[11] Patent Number: 5,162,979
[45] Date of Patent: Nov. 10, 1992

[54] PERSONAL COMPUTER PROCESSOR CARD INTERCONNECT SYSTEM

[75] Inventors: Thomas A. Anzelone, Ft. Lauderdale; Samuel T. Cheung; Mark E. Cohen, both of Boca Raton; Kevin K. Cooke, Delray Beach; John R. Dewitt, Boca Raton; Michael S. Miller, Delray Beach; Jay H. Neer, Boca Raton; Eddie M. Reid, Boca Raton; Robert D. Wysong, Boca Raton, all of Fla.

[73] Assignee: International Business Machines Corp., Armonk, N.Y.

[21] Appl. No.: 425,669

[22] Filed: Oct. 23, 1989

[51] Int. Cl.⁵ .................. H05K 7/10; H01R 13/629; H01R 23/70
[52] U.S. Cl. .................. 361/415; 361/399; 361/413; 439/157; 439/633
[58] Field of Search ............. 439/157, 633, 680, 681; 361/399, 413, 415; 364/708, 709.1

[56] References Cited

U.S. PATENT DOCUMENTS

| | | | |
|---|---|---|---|
| 3,818,280 | 6/1974 | Smith et al. | 439/633 |
| 4,002,381 | 1/1977 | Wagner et al. | 361/415 X |
| 4,083,616 | 4/1978 | McNiece et al. | 439/157 |
| 4,223,973 | 9/1980 | Tambarro | 439/633 X |
| 4,239,323 | 12/1980 | Tambarro | 439/633 X |
| 4,241,381 | 12/1980 | Cobaugh et al. | 361/413 |
| 4,301,494 | 11/1981 | Jordan | 439/157 X |
| 4,313,150 | 1/1982 | Chu | 439/157 X |
| 4,501,465 | 2/1985 | Hoshino et al. | 439/633 |
| 4,537,454 | 8/1985 | Douty et al. | 439/157 |
| 4,573,140 | 2/1986 | Szeto | 364/900 |
| 4,614,389 | 9/1986 | Albert et al. | 439/157 X |
| 4,740,164 | 4/1988 | Schulz et al. | 439/157 X |
| 4,846,699 | 7/1989 | Glover et al. | 439/157 X |
| 4,846,734 | 7/1989 | Lytle | 439/637 |
| 4,890,832 | 1/1990 | Komaki | 364/709.1 X |
| 4,924,355 | 5/1990 | Mitchell et al. | 361/415 |
| 4,942,550 | 7/1990 | Murray | 364/900 |
| 5,036,313 | 7/1991 | Lin et al. | 364/708 X |

OTHER PUBLICATIONS

IBM, "Personal System/2 Hardware Interface Technical Reference", 1988, Pages 1/3–1/6.
W. L. Rosch, "The Winn Rosch Hardware Bible", 1989, pp. 23–35.
Calmark, "Electronic Packaging Products", 1989, pp. 28 & 30.
J. H. Neer, H. Piorunneck, "Burndy", 1988, pp. 4–7.

Primary Examiner—Leo P. Picard
Assistant Examiner—Michael W. Phillips
Attorney, Agent, or Firm—Winfield J. Brown, Jr.; Stephen A. Terrile

[57] ABSTRACT

A personal computer system unit has a planar card upon which is mounted a processor card. The processor has mounted thereon those components, except for system memory, which are most likely to be replaced for a system upgrade. The processor card has a printed circuit board with printed circuits thereon that terminate along one edge at contacts. Two aligned edge connectors are mounted on the planar board. One connector has a key which engages a slot on the edge of the processor card to align the many contacts with contact arms. Two levers are mounted on the card and cooperate with frame elements to insert, extract and latch the processor card. Each element also has a guide to align the processor card for insertion into the edge connectors.

19 Claims, 7 Drawing Sheets

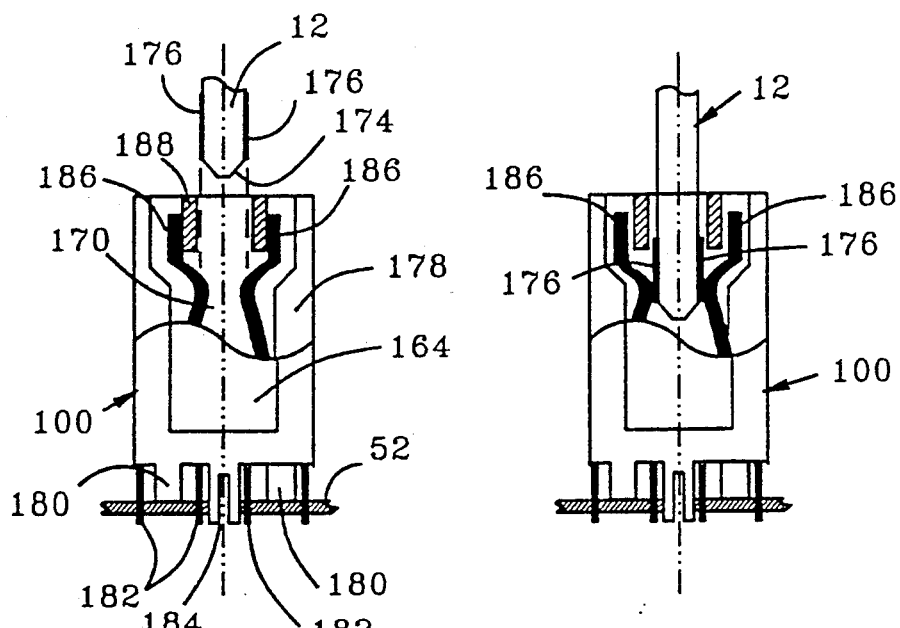
FIG. 4
FIG. 5
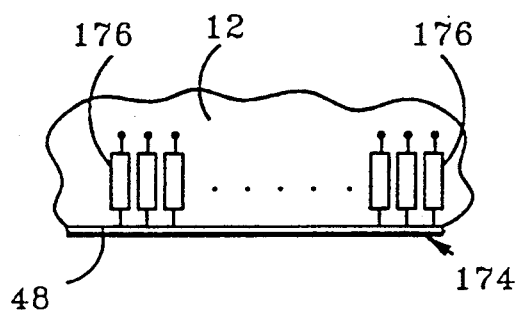
FIG. 6
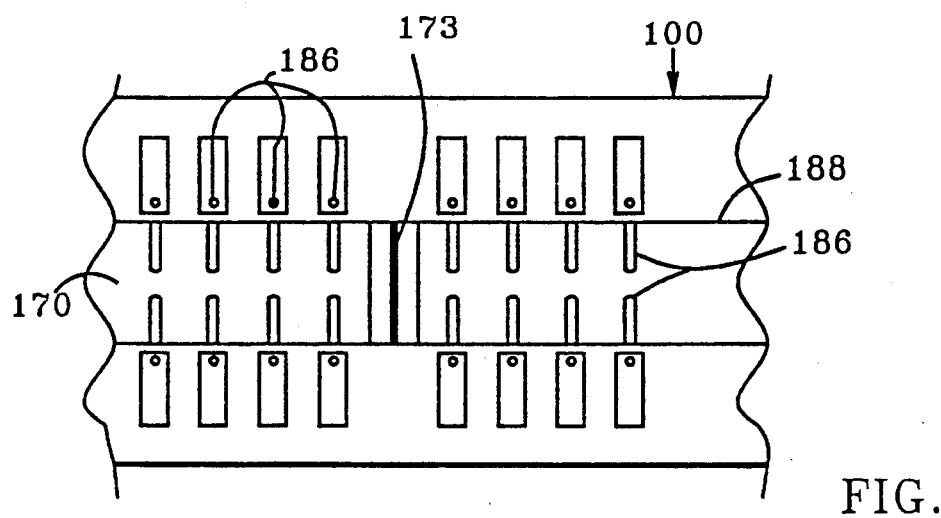
FIG. 7

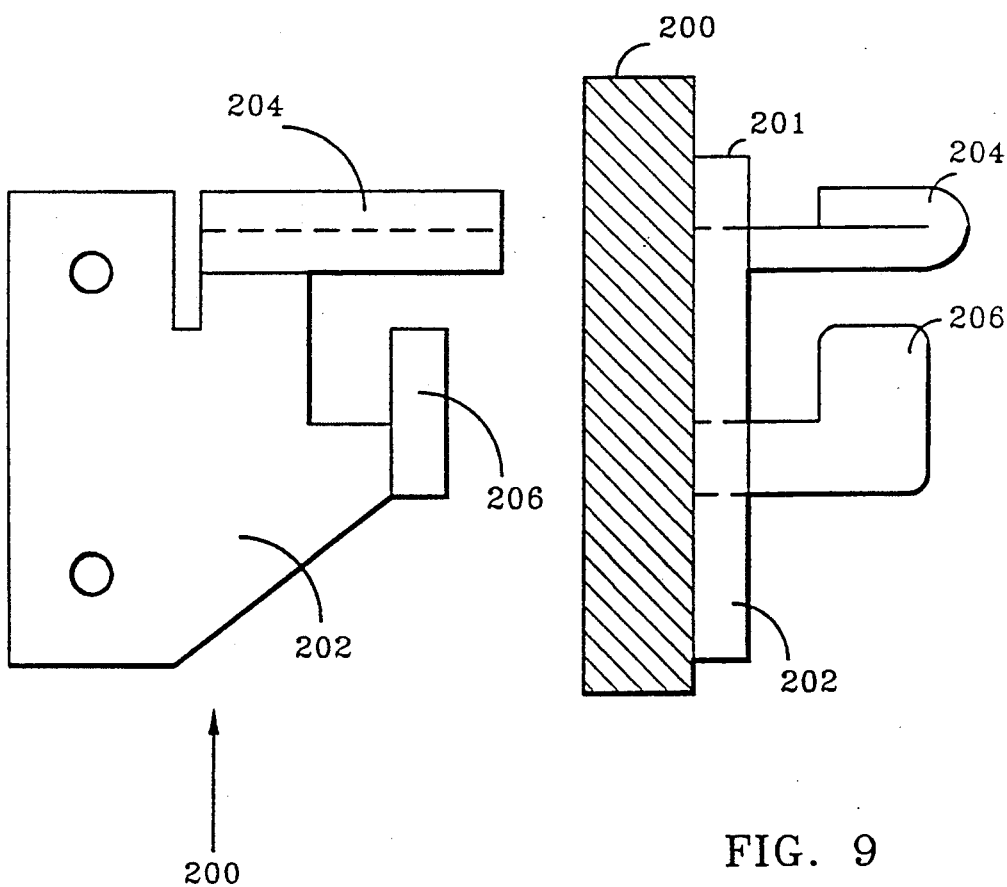

PERSONAL COMPUTER PROCESSOR CARD INTERCONNECT SYSTEM

FIELD OF THE INVENTION

This invention relates to improvements in data processing systems of the type in which various components, including a microprocessor, are mounted on printed circuit boards (PCB's). More particularly, it relates to an improved personal computer system unit design in which a processor card having a microprocessor and other related components mounted on a PCB, is mounted on a planar board by means of a novel interconnect system that facilitates installation and replacement of the processor card.

BACKGROUND OF THE INVENTION

The history of personal computer design is characterized by continuing technological improvements not only in the microprocessors but also in associated components. A desirable objective is to provide a system unit design that is stable and in which the various components or assemblies thereof, can be replaced by the user with upgraded, improved components without requiring the user to have any technical skill or use special tools. Processor cards have been suggested in which the microprocessor and related components are mounted on a PCB that can be plugged into a mating connector on a planar board. Yet such a design may not be suitable for some current technology.

Current technology includes personal computers having thirty-two bit wide data and address paths which causes the processor card to have a multiplicity of wires and edge contacts. In order to plug such a card into a mating edge connector, a relatively great force is needed to spread the mating contact arms and develop the necessary wiping force required to establish good electrical contact. Such great force needs to be very carefully applied to the processor card in order not to bend or flex the card great enough to break a wire or a component.

Another objective of personal computer design is to provide a relatively low cost unit. As the number of contacts on a processor card increases, the cost of a single, mating connector increases non-linearly due to the high density of the contacts and the cost of building a long line of contact arms within the necessary close tolerances.

SUMMARY OF THE INVENTION

One of the objects of the invention is to provide an improved personal computer system unit having a processor card mounted on a planar board in such a manner as to allow a user to readily replace the processor card.

Another object of the invention is to provide a replaceable processor card adapted to be mounted on a planar board, the processor card having mounted thereon a microprocessor, a direct memory access (DMA) controller, a read only memory (ROM), a memory controller, a bus controller, and error checking means all of which are interconnected with printed circuits that terminate in a multiplicity of edge contacts which mate with corresponding contact members on the planar board, the edge contacts being in the many data, address, interrupt, and control lines extending between the processor card and planar board.

Another object is to provide a processor card with a novel interconnect system facilitating installation and removal of the card.

Another object is to provide a simple, low cost interconnect system for a printed circuit board having a multiplicity of contacts spaced along one edge thereof.

A further object is to provide a processor card requiring a relatively great force to plug it into a connector, with a user operated force amplifying means that controls the application of the force to the card so as not to bend or flex the card during installation and removal.

Still another object is to provide a processor card, having a large number of edge contacts and mating connector means, which is low cost while providing a multiplicity of mating contacts all located within high tolerances necessary to align and mate with the corresponding edge contacts.

A still further object is to provide a processor card having a large number of edge contacts with a novel inserter/extractor which coacts with a stationary frame element to not only develop high forces necessary to install and extract the processor card, but also acts as a guide to align the processor card during installation and as a lock to hold the card in place.

Another further object is to provide a novel connector system for use with a processor card having a large number of edge contacts, the system using existing connector designs to avoid having to retool to make an otherwise larger single connector.

Briefly, in accordance with one aspect of the invention, the manner in which certain of the above objects is attained is to provide a processor card comprising a printed circuit board (PCB) on which are mounted a microprocessor and such other related components as are likely to be upgraded or improved. Such components may include a cache, cache controller, a read-only memory containing operating system programs, a direct memory access controller, a coprocessor, error checking circuits, a bus controller, and a memory controller. The processor card has one edge along which a multiplicity of closely spaced contacts are arranged on opposites sides of the PCB. The contacts carry the many data, address, control, power and interrupt signals transmitted between the processor card and a planar board. Because of the large number of contacts, the processor card has novel means for bringing the contacts into precise engagement with mating edge connectors on the planar board. Two levers are pivotally mounted on the card and are engageable with stationary fulcrums mounted on the frame of a personal computer for generating the high forces needed to engage and separate the contacts from the mating connector.

In accordance with another aspect of the invention, the mating connector is formed from two edge connectors each having the same or approximately the same number of contacts arms. The two connectors are mounted on the planar board in very exact, aligned locations, such connectors being provided with a locating key that is engageable in a slot along the edge of the processor card to precisely align and locate the contacts relatively to the contact arms.

In accordance with still another aspect of the invention, the levers function as inserter/extractors and coact with the fulcrums on the frame. Such fulcrums are further provided with guides that fit into slots into the levers and are located to guide the edge contacts into the mating connectors. The levers are provided with means to "lock" onto the PCB and engage the fulcrums to thereby hold the processor card in place.

DRAWINGS

Other objects and advantages of the invention will be apparent from the following description taken in connection with the accompanying drawings wherein:

FIG. 4 is an enlarged end elevation view, with portions removed, of an edge connector on a planar board, about to mate with the edge of a processor card;

FIG. 5 is a view similar to FIG. 4 showing the edge of the processor card mated with the edge connector;

FIG. 6 is an enlarged detail view showing contacts on the edge of the processor card;

FIG. 7 is a top plan view of a portion of an edge connector;

FIG. 8 is a front elevational view of a frame element:

FIG. 9 is an end elevational view of the frame element shown in FIG. 8, mounted on a frame;

DETAILED DESCRIPTION

Figure 1:
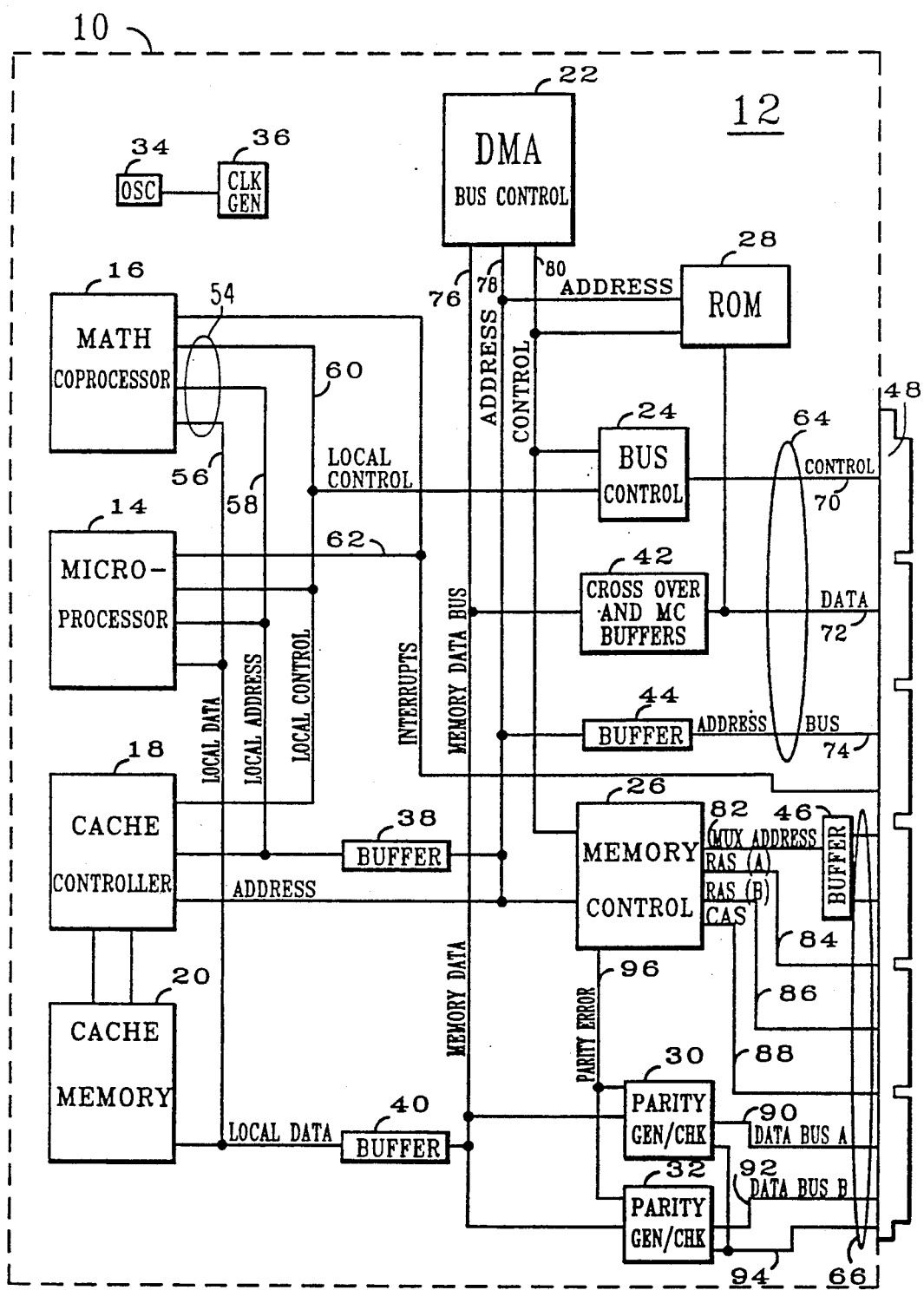
FIG. 1 is a schematic block diagram of a processor card constructed in accordance with the invention.

Referring now to the drawings and first to FIG. 1, a processor card 10 comprises a printed circuit board 12 having surface mounted thereon a plurality of commercially available components including a microprocessor 14, a math coprocessor 16, a cache controller 18, a cache memory 20, a direct memory access (DMA) bus control unit 22, a bus control 24, a memory controller 26, a read only memory (ROM) 28, parity checking units 30 and 32, an oscillator 34 and clock generator 36. Preferably, the microprocessor is a high performance type, such as an Intel 80383 microprocessor, having thirty two bit data paths and providing thirty two bit addressing capability. The remaining components are selected in conventional fashion for their compatability with such microprocessor. A plurality of buffers 38, 40, 42, 44 and 46 are connected as shown and provide selective isolation or connection between the circuits allowing different portions to be concurrently used, e.g., to move data between the microprocessor and cache while data is being transferred between an I/0 unit and main memory. All of the above components are electrically connected to each other as appropriate by printed wiring circuits in PCB 12 which terminate at contacts, described below, located along an edge 48. Such edge is pluggable into edge connectors on planar board 50 shown in FIG. 2.

The wiring circuits of PCB 12 include a local bus 54 including data, address and control lines 56, 58 and 60 respectively, which interconnect microprocessor 14 with coprocessor 16, cache controller 18 and cache memory 20, as shown in FIG. 1. The remaining circuit lines generally include interrupt lines 62, channel bus lines 64 and memory bus lines 66. The channel bus lines 64 include control, data and address bus lines 70, 72 and 74 respectively. Memory bus lines 66 include multiplexed memory address lines 82, row address strobe (RAS) lines 84 and 86 for memory banks A and B, column address strobe (CAS) line 88, data bus A and B lines 90 and 92, and a line 94 for use in error checking via parity check or ECC checking. Further circuit lines include those needed for direct memory access and include memory data lines 76, address lines 78, and control lines 80. For simplicity, certain miscellaneous lines, such as reset, grounds, power-on, etc. have been omitted from the drawings.

Figure 2:
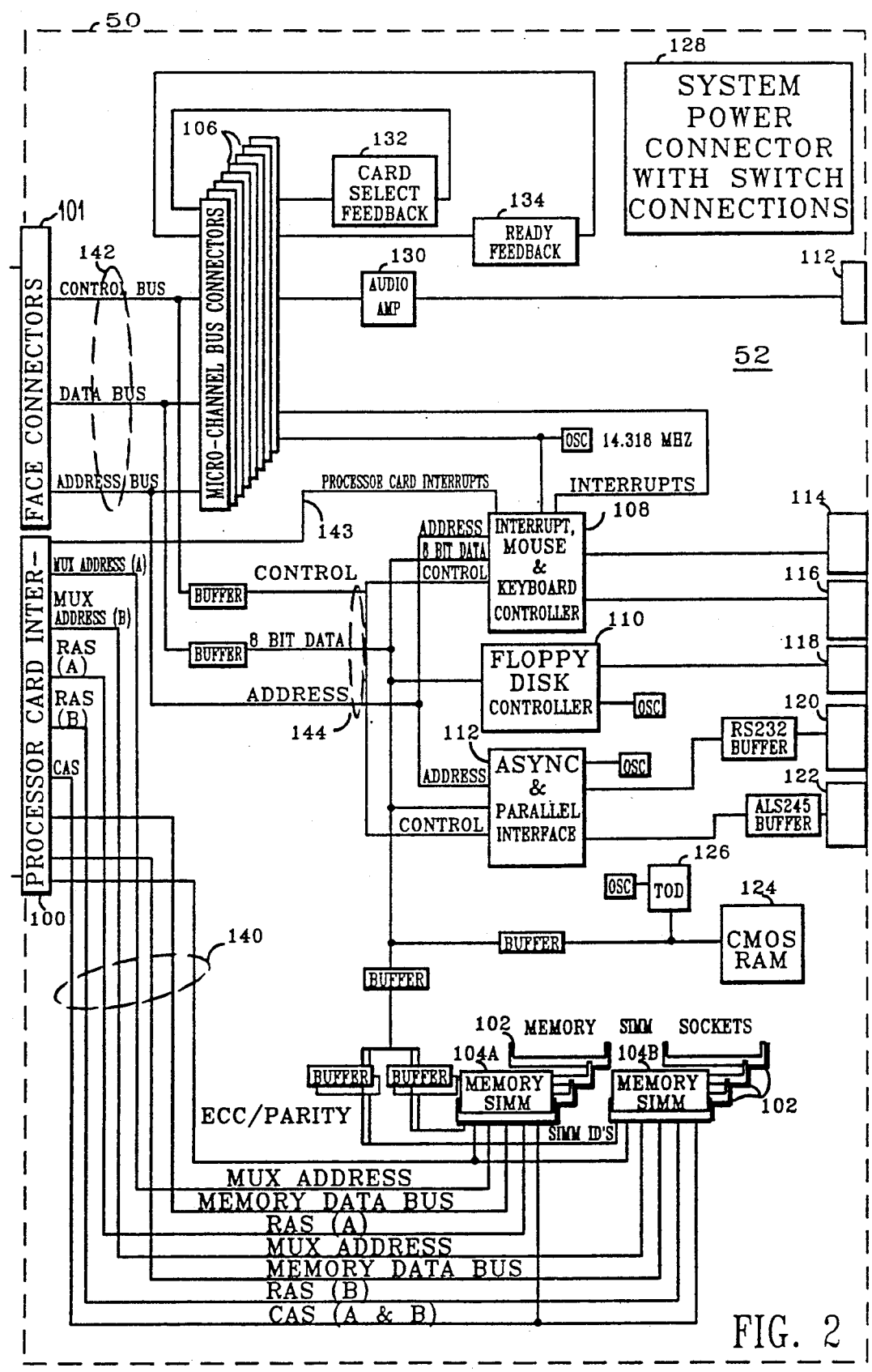
FIG. 2 is a schematic block diagram of a planar board constructed in accordance with the invention.

Referring to FIG. 2, planar board 50 comprises a PCB 52 upon which are surface mounted various components that are interconnected by wiring or circuits in the PCB. Such components include two processor card connectors 100 and 101 described in more detail below, into which processor card 10 is plugged for mounting the processor card upon the planar board. A plurality of single in-line memory module (SIMM) connectors 102 are also mounted on PCB 52 for connecting to memory banks 104A and 104B each having SIMM's thereon forming the system main memory. One or more expansion connectors 106 are also mounted on PCB 52 for connection to different expansion adapters and options (not shown) that might be added or incorporated into the personal computer system. Connector 106 is a commercially available connector of the type conforming to the above mentioned Micro Channel architecture, and connectors 100 and 101 are identical thereto but differ in their use as to what signals or ground lines are connected to the various elements in each connector.

Also mounted on planar board 50 are an interrupt, mouse and keyboard controller 108, a floppy disk controller 110, and an asynchronous and parallel interface 112 connected to a keyboard connector 114, a mouse connector 116, a diskette connector 118, an asynchronous connector 120, and a parallel port connector 122, which allow various I/O devices to be connected into the system.

A system power connector 128 is mounted on PCB 52 for connection to a plug in power unit that supplies the necessary power for the system. A CMOS RAM 124 and a time-of-day clock 126 are also mounted on PCB 52. Also mounted on PCB 52 are an audio amplifier 130, a card select feedback 132 and a ready feedback 134. The PCB 52 also has mounted thereon various oscillators to provide timing signals, and buffers to isolate sections of the circuitry.

The wiring of PCB 52 interconnects the various components as shown in the drawing and is grouped into three groupings, a memory bus 140, a channel bus 142, and miscellaneous signal lines including interrupt lines 143 all of which are connected to counterpart wiring on PCB 12 through connectors 100 and 101. Tapped off bus 142 is a planar function bus 144.

Figure 3:
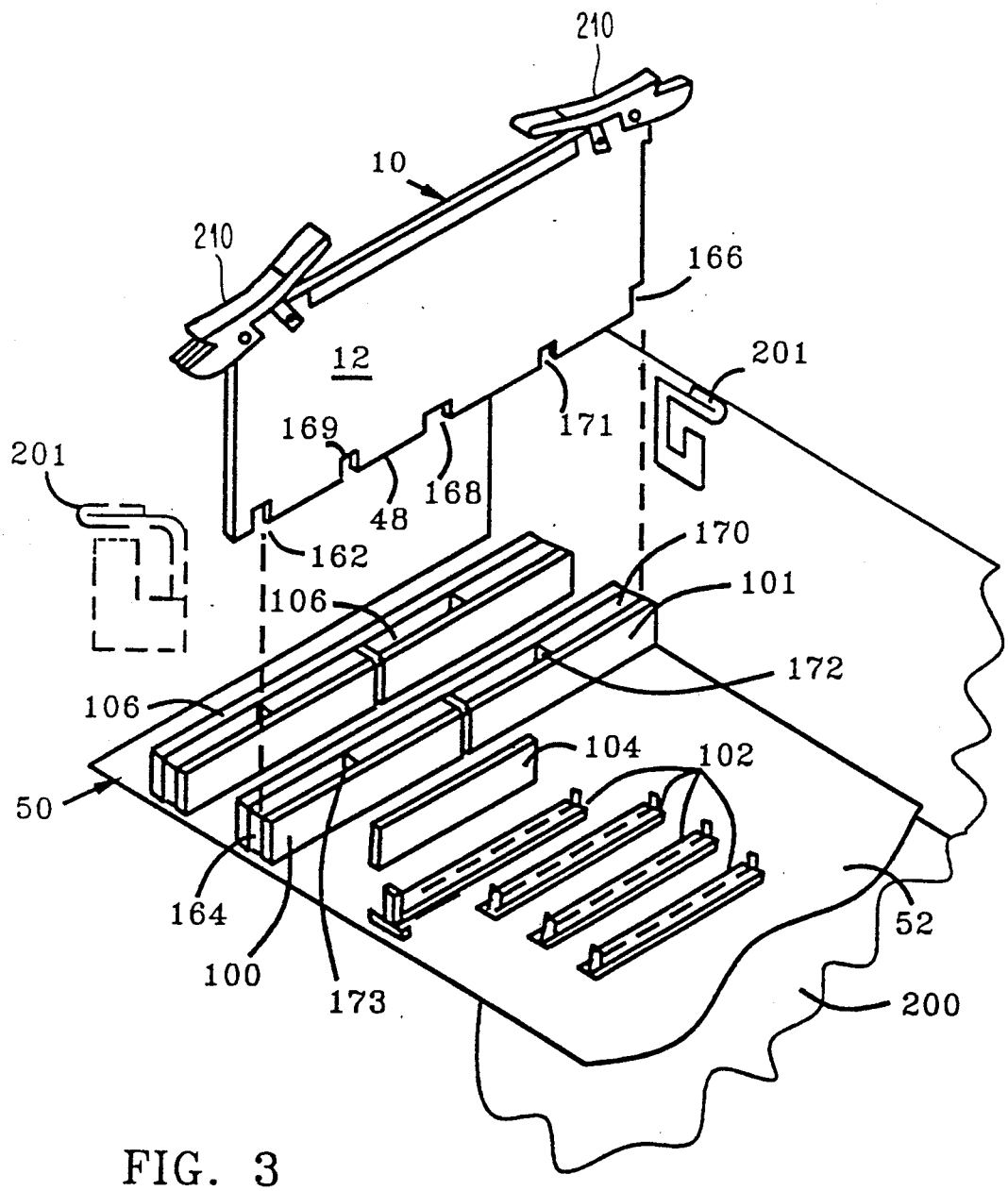
FIG. 3 is a exploded, isometric view, with portions removed, showing portions of the invention.

Referring now to FIG. 3, the system unit includes a frame assembly 200 upon which planar board 50 is mounted. Planar board 50 comprises a PCB 52 which is thin, flat, and rectangular, and has its components surface mounted thereon on the surface located away from the frame assembly. Processor card 10 is designed to be mounted generally perpendicular to PCB 52 and thus the connectors 100 and 101 are located with their mounting grooves (described below) opening in a direction away from the planar board. Connectors 100 and 101 are longitudinally aligned, i.e., they are mounted end to end, with the adjacent ends being slightly spaced to allow the connectors to be located with their contact arms correctly spaced to mate with the edge contacts as hereafter described. Each expansion connector 106 is mounted on the planar board parallel to connectors 100 and 101. Memory connectors 102 are mounted in parallel rows.

As seen best in FIG. 3, PCB 12 is flat, thin and rectangular. The lower edge 48 is long and straight and has a first notch 162 therein providing clearance to fit over the end wall 164 of the adjacent connector 100. A corner of PCB 12 is notched at 166 to provide clearance for the opposite end wall of the other connector 101. A central notch 168 provides clearance to fit over the adjacent end walls of connectors 100 and 101. A notch 171 provides clearance to fit over key 172 of connector 101. A notch 169 has a tight sliding fit over key 173 of connector 100 to properly locate PCB 12 relative to connectors 100 and 101. The keys are in the middle of the connectors and serve as reference points for positioning the contact arms in the connectors during the fabrication thereof. During assembly of the planar board, keys 172 and 173 are used to precisely align and position connectors 100 and 101 relative to each other. Thus, only one key 173 and one notch 169 need be used to align the contacts on the processor card with the contact arms in the connectors.

The lower edge 48 is beveled at 174 to form a wedge operative to guide such edge between the rows of contact arms when card 10 is installed. Spaced along edge 48 are a multiplicity of contacts 176 located in two rows on opposite sides of PCB 12. The contacts form part of the wiring or circuits of the PCB and are evenly spaced in each row with a center to center spacing of 0.05 inches. The contacts are very thin and lie substantially flush with the surface of the PCB. The contacts are accurately positioned relative to notch 169 so that the notch can be used to properly align the mating contacts and contact arms.

Referring now to FIGS. 4–7, connector 100 has a generally rectangular transverse cross section and is composed of an insulating body 178, a multiplicity of connector pins 182 and a like multiplicity of contact arms 186 connected to such pins. In the preferred embodiment, connector 100 has one hundred sixty four pins, and PCB 12 has three hundred twenty eight contacts. Connector 100 is surface mounted on PCB 52 and has a plurality of standoffs 180 that space the body slightly away from the adjacent surface of PCB 52. Pins 182 extend through PCB 52 and are reflow soldered thereto to electrically and mechanically mount the connector on PCB 52. A bifurcated locating pin 184 extends through the PCB and is used to roughly attach the connector to the board during the assembly/fabrication process. Contact arms 186 are arranged in two rows extending along groove 170, the contact arms being flexible, spring members biased or preloaded into engagement with abutments 188. The contact arms are bent or shaped so as to extend into groove 170 whereby the spacing between adjacent pins in opposite rows (across groove 170) is less than the thickness of PCB 12. The contact arms have the same spacing as contacts 176. When the processor card is installed, the bevel 174 wedges the contact arms apart against the bias thereof to develop a wiping force equivalent to the mass of at least seventy five grams per each contact/contact arm engagement thereby insuring a good electrical contact therebetween. Such wiping force is obviously dependent on the spring constant of the contact arms and the amount of deflection. The use of two commercially available connectors is advantageous because it results in a less expensive design by not requiring any retooling that would otherwise be required to use a new, single connector having the necessary number of contact arms.

As shown in FIG. 3, two frame elements 201, which form part of the frame assembly 200, are mounted in positions adjacent the mounted position of processor card 10. Referring to FIGS. 8 and 9, each element 201 is similar so only one need be described. Element 201 is of sheet metal and has a flat base 202, a fulcrum/latch member 204 that extends outwardly from the base, and a guide 206 that also extends outwardly from the base at a right angle relative to member 204 but spaced therefrom.

As shown in FIG. 3, processor card 10 has two actuators or levers 210 mounted on opposite corners of PCB 12 on its top edge. The levers function as inserters, extractors, and latches to facilitate installation and removal of the card and to lock or latch the card in position. The levers are identical so only one need be described in detail.

Referring to FIGS. 10–13. lever 210 has an elongated body 212 provided at one end with a handle 214. The other end is specially shaped to coact with frame element in a manner described in detail below. Lever 210 has a pivot hole 216 through which a pivot pin 218 extends allowing the lever to be rotated about the axis of the pin. The pin is press fitted into PCB 12. The specially shaped end is in the form of an open mouth having an upper jaw 220 and a lower jaw 222 providing two fulcrum surfaces 224 and 226. The lower jaw is split or bifurcated by a slot 227 of a width slightly greater than the thickness of guide 206 to provide a sliding fit therewith. Slot 228 and guide 206, when interfitted, occupy the same radial plane relative to the axis of rotation of the lever. Pivot hole 216 is located closer to jaws 220 and 222 than to handle 214 so as to provide unequal moment arms. Handle 214 is further from the pivot hole, and hence from the axis of rotation, to provide a longer moment arm than the length of the moment arm to the jaws whereby a force manually applied to handle 214 is amplified to develop the higher forces necessary to insert and remove card 10. Lever 210 is a classical class 2 lever where one end acts as the fulcrum, the pivot pin located between the ends acts as the load, and the handle end receives the actuating force. Lever 210 further includes two parallel, flexible arms 228 that are spaced apart a distance slightly greater than the thickness of PCB 12. Two opposed dimples 230 project towards each other from adjacent sides of arms 228 and are engageable in holes 232 in PCB 12 to releasably lock lever 210 in place against the upper edge of PCB 12. To accomplish this, dimples 230 and holes 232 are located the same radial distances from the axes of rotation of the levers.

The two frame elements 201 are mounted in positions close to where the levers 210 will be when the processor card is installed or mounted on the planar board. The elements coact with the levers to install and extract the processor card and therefore act to generally align the processor card with connectors 100 and 101 at the start of installation. Guides 206 provide a more accurate aligning function, they being accurately located relative to connectors 100 and 101 so that when the levers 210 are engaged with the guides, PCB 12 is precisely perpendicular to the planar board and lies in a plane extending in the direction of movement of the PCB. When thus aligned, the upper edge of PCB 12 lies directly above connectors 100 and 101 and the forces of the levers acting on the PCBs are directed downwardly through the plane of the PCB without introducing any lateral forces that might otherwise bend the PCB and possibly break some of the printed circuits therein.

Figure 10:
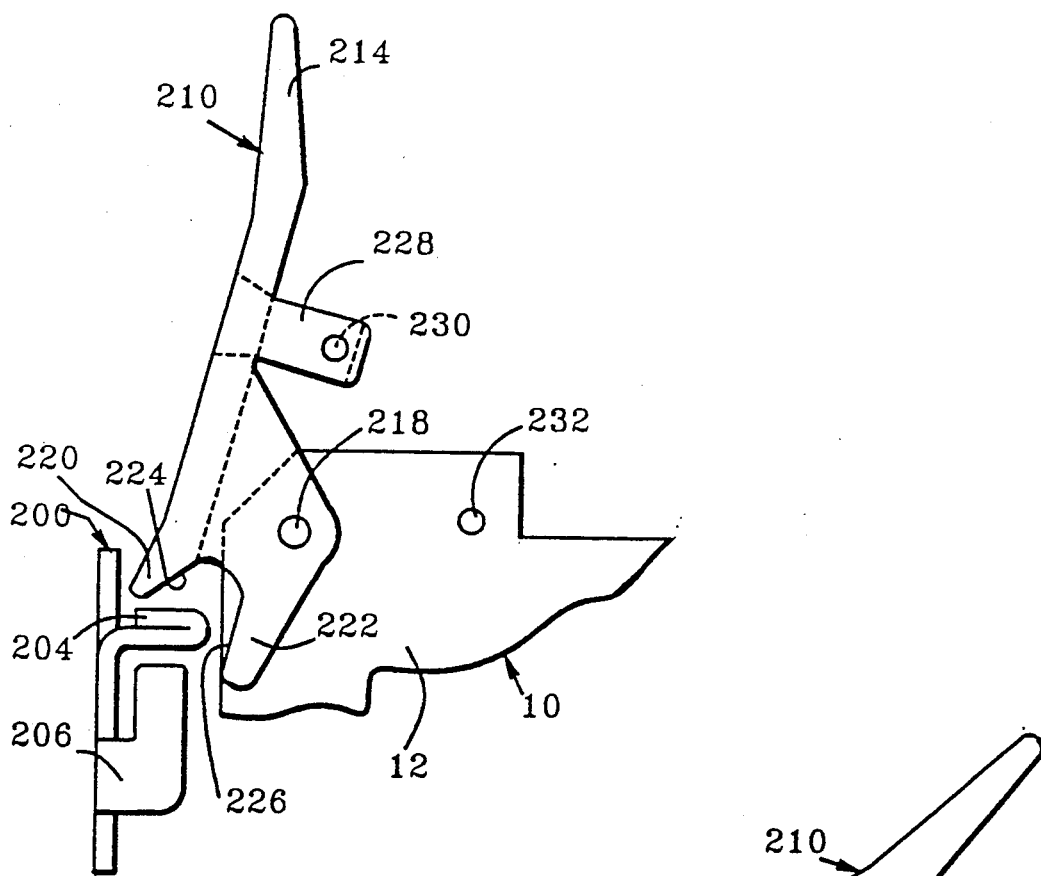
FIGS. 10-12 are elevational views showing progressive relative positions of an actuator and a frame element, as the processor card is mounted on the planar board.
Figure 11:
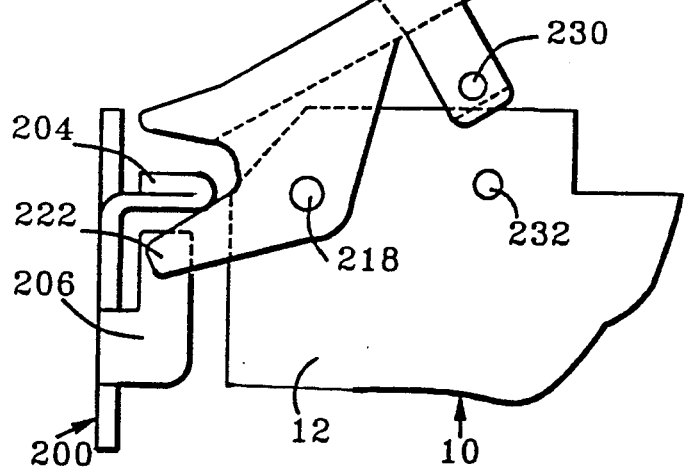
Figure 12:
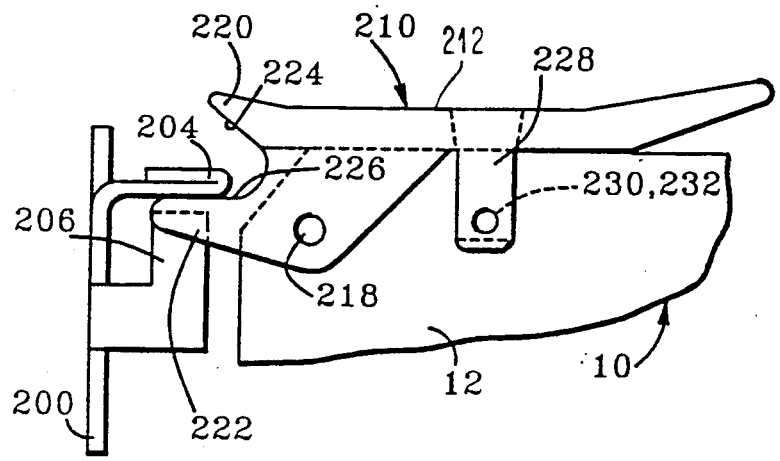
Figure 13:
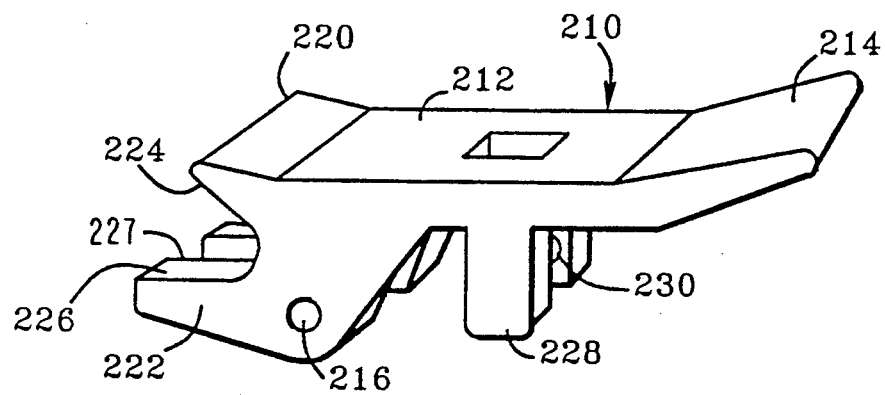
FIG. 13 is a perspective view of an actuator.

In order to install or mount processor card 10 on planar board 50, levers 210 are rotated to an open position wherein they extend above PCB 12 and provide handles for lifting and guiding edge 48 into connectors 100 and 101. In such position, as best seen in FIG. 10, jaw 222 is displaced from fulcrum 204 to allow the jaw to be lowered past the fulcrum 204. During the process of lowering, lever 210 is concurrently rotated clockwise as viewed in FIG. 10. The levers would be moved laterally as necessary to align slots 228 with guide 206 and thereby allow the guide to enter the slots as continued rotation occurs. Such movement causes surface 226 to abut fulcrum 204 on the undersurface thereof. This should occur about at the point when edge 174 is resting on top of contact arms 186. Continued rotation of lever 210 forces the lower edge bevel 174 to wedge the rows of contact arms 186 apart against the bias thereof while lowering edge 48 between the contact arms (FIG. 5). During such lowering, surface 226 slides on the underside of fulcrum 204 and passes through the position shown in FIG. 11. Rotation continues until the underside of body 212 of lever 210 abuts the adjacent top edge of PCB 12, as shown in FIG. 12. As the lever moves into this latter position, arms 228 straddle PCB 12 and the dimples 230 slide thereover until they move into locking hole 232 in PCB 12. The dimples are spherical and in conjunction with the flexibility of arms 230 provide a releasable latch or lock to hold lever 210 in the latched position. At such point, surface 222 abuts the underside of fulcrum 206 and thereby prevents upward movement of PCB 12 until such time as lever 210 is rotated in the opposite direction. Removal is accomplished by simply rotating the levers to initially overcome the force needed to move the dimples from holes 232 and the frictional forces holding the lower edge 48 in connectors 100 and 101. Such latter rotation brings surface 224 of the upper jaw 220 into contact with the upper surface of fulcrum 204 allowing the lever to amplify the forces manually applied thereto causing such rotation. Continued rotation will separate PCB 12 from the connectors allowing the processor card to be lifted away from the planar board.

It is to be appreciated that the system described above is advantageous in several ways. First, the system units may be of two types, a table model and a floor standing model which allows a variety of different personal computer models to be made differing in one aspect by the number of expansion and memory slots. Second, processor cards using different microprocessors can have different components mounted thereon to provide different performance characteristics and a user could readily replace or upgrade the system. Third, the system can be improved by replacing the memory units with ones of greater speed or storage capacity, and this can be readily done at the same time a processor card is replaced. Fourth, a processor card need not have all the components shown in the illustrated embodiment. The coprocessor, cache and its controller, are optional, although their absence will cause the system to perform at a lesser level. Error correction code (ECC) circuitry can be used in place of the parity checking. Fifth, since the upgradeable components (i.e., the processor card and memory cards) are easily replaceable, the remaining components provide a stable design that should be usable for several years.

It is also to be appreciated that many other changes can be made in the details and arrangements of parts without departing from the scope of the invention as defined in the appended claims.

What is claimed is:

1. A personal computer system unit comprising:
   a frame;
   a planar board mounted on said frame,
   a processor card assembly removably mounted on said planar board;
   said planar board comprising a first printed circuit board (PCB) having a plurality of first components mounted thereon and first circuit means electrically interconnecting said first components;
   said first components comprising a main memory for storing programs and data, I/O connector means adapted to be connected to I/O devices, and I/O controllers for controlling transference of information to and form said I/O devices;
   said first circuit means comprising an I/O bus and a memory bus;
   said first component means further comprising electrical edge connector means connected to said I/O bus, said memory bus, and said processor card assembly, said edge connector means comprising a multiplicity of springlike contact arms arranged in two opposing rows, said contact arms in each row being biased towards the arms in the other row, said contact arms in each row being longitudinally evenly spaced along such row;
   said processor card assembly comprising a second PCB having a plurality of second components mounted thereon and second circuit means interconnecting said second components;
   said second components comprising a microprocessor, a memory controller, a read-only memory storing operating system routines, error checking means, a bus controller and a direct memory access controller;
   said second PCB having a straight edge extending into an opening defined by said two opposing rows of contact arms, said second PCB further comprising a multiplicity of surface contacts located along and adjacent to said edge on opposite sides of said second PCB, said surface contacts being evenly space along said edge in correspondence with the spacing of said contact arms and being electrically engaged with a different one of said contact arms with a normal force due to the bias of said contact arms so as to establish effective electrical contact therebetween, said surface contacts being connected to and forming part of said second circuit means whereby said first and second circuit means are interconnected through said contacts and said contact arms, said second PCB being frictionally held in place by a total frictional force developed between all of said surface contacts and contact arms;
   first and second pivot pins mounted on said second PCB at opposite corners thereof away from said edge;
   first and second fulcrums mounted on said frame adjacent to said processor card assembly;
   and elongated first and second levers pivotally mounted on said second PCB for rotation about said pivot pins on axes that extend through said levers at points intermediate to the ends thereof, each axis being closer to one end of its lever mounted than to the other end creating two moment arms in each lever with one arm being shorter that the other arm, said one ends of said first and second levers being respectively engaged with said first and second fulcrums, said one ends each having a pair of angularly joined jaws straddling said fulcrums and providing first and second surfaces, said first surfaces being engaged with said fulcrum means to present movement of said processor card assembly in one direction except upon rotation of said levers, said second surfaces being engageable with said fulcrums upon rotation of said levers to extract said processor card assembly from said edge connector means.

2. A unit in accordance with claim 1 wherein:
said second circuit means comprises an internal bus connected to said microprocessor, a channel bus connected to said internal bus and to certain ones of said surface contacts, and a memory bus connected to said internal bus and certain other ones of said contacts, said channel bus of said first PCB being connected to contact arms engaged with said certain ones of said contacts, and said memory bus of said first PCB being connected to contact arms engaged with said certain other ones of said contacts, to form an channel bus and a memory bus which extends through said planar board and said processor card.

3. A unit in accordance with claim 2 comprising:
cache means mounted on said second PCB and being connected to said internal bus, and a coprocessor mounted on said second PCB and being connected to said internal bus for performing certain operation faster than said microprocessor.

4. A unit in accordance with claim 2 comprising:
a bus control unit mounted on said second PCB and being connected to said channel bus for controlling operation thereof.

5. A unit in accordance with claim 1 comprising:
latching means on said first and second levers engageable with said second PCB for latching said levers into predetermined positions relative to said second PCB.

6. A unit in accordance with claim 5 wherein:
said latching means comprises a pair of flexible arms on each lever straddling an adjacent portion of said second PCB and being engaged therewith.

7. A person computer system unit comprising:
a frame;
a planar board mounted on said frame, said planar board comprising a first printed circuit board (PCB) and a plurality of first components mounted on said first PCB including first electrical connector means;
said first electrical connector means comprising first and second edge connectors each comprising an elongated insulating housing having a multiplicity of springlike contact arms mounted therein in two opposing rows separated by a gap having a width, said contact arms being biased one row towards the other row;
a processor card assembly comprising a thin, flat, generally rectangular second PCB, and a plurality of second components mounted on said second PCB including a microprocessor, a memory controller, a direct access memory controller, a bus controller and error checking means, said second PCB having second circuit means interconnecting said second components;
said second PCB having a straight edge and a multiplicity of surface contacts located along and adjacent to said edge on opposite sides of said second PCB, said edge being beveled so as to provide a wedge, said second PCB having a thickness greater than said width of said gap, each of said contacts being electrically connected to said second circuit means;
fulcrum means mounted on said frame adjacent to said processor card assembly;
and first and second levers pivotally mounted on said processor card assembly for rotation between first and second positions relative to said processor card assembly, said rotation being about axes that extend perpendicular to said second PCB and through said levers at points intermediate to the ends thereof, each lever having a handle at one end and a pair of angularly joined jaws at is other end, said jaws providing first and second camming surfaces, said levers being operative upon engagement of said first surfaces with said fulcrum means and concurrent rotation of both levers from said first positions to said second positions so as to force said wedge into said gap to thereupon move said contact arms against said bias thereof and slide along said edge into engagement with said contacts, said first surfaces abutting said fulcrums when said levers are in said second positions so as to prevent movement of said processor card assembly except upon rotation of said levers out of said second positions, said second surfaces of said jaws being operative upon rotation of said levers from said second positions to cam against said fulcrums and move said processor card assembly out of engagement with said first and second edge connectors.

8. A unit in accordance with claim 7 comprising:
a locating key extending laterally across said gap in said first edge connector, said edge of said second PCB having a notch therein the walls of which are slidingly engageable with said key to align said contacts with said contact arms and prevent any longitudinal movement between said second PCB and said edge connectors.

9. A unit in accordance with claim 8 comprising:
a second key extending across the gap i said second edge connector, said first and second connectors being longitudinally spaced apart to located said connectors relative to one another by a distance between said first and second keys, said edge of said second PCB having a second notch therein of a size larger than said second key t freely allow said edge to fit over said second key.

10. A unit in accordance with claim 7 comprising:
a first guide attached to said frame adjacent to said first fulcrum and being engaged with said first lever to prevent lateral movement of said second PCB.

11. A unit in accordance with claim 10 wherein:
said first guide comprises a flat element, and said first lever has a split jaw straddling both sides of said flat element.

12. A unit in accordance with claim 11 wherein: said first guide and said first fulcrum are made in a single unit with said fulcrum extending transversely, and said first guide lying generally in alignment with said second PCB and immediately adjacent to said first fulcrum.

13. A unit in accordance with claim 10 further comprising:
a second guide located adjacent said second fulcrum and being engaged with said second lever to prevent lateral movement of said second PCB at a second portion thereof.

14. A processor card assembly for use in a personal computer system unit having a frame and tow frame elements mounted on the frame for facilitating installation and removal of the processor card assembly; a planar board mounted on the frame, the planar board including a planar board printed circuit board (PCB) having a plurality of planar board components mounted thereon and planar board circuit means electrically interconnecting the planar board components; the planar board components including a main memory for storing programs and data, I/O connector means adapted to be connected to I/O devices, and I/O controller for controlling transference of information to and from the I/O devices; the planar board circuits means comprising a channel bus and a memory bus; the planar board component means further including electrical edge connector means connected to the channel bus and the memory bus, the edge connector means including a multiplicity of springlike contact arms arranged in two opposing rows separated by a gap of predetermined width, contact arms in each row being biased towards the arms in the other row, contact arms in each row being longitudinally evenly spaced along such row; the processor card assembly comprising:
a flat rectangular processor card PCB having a thickness greater than the width of the gap, said processor card PCB having a plurality of processor card components mounted thereon, said plurality of processor card components consisting of a microprocessor, a memory controller, a direct access memory controller, a read only memory, a bus controller and error checking means, said processor card PCB further comprising processor card circuit means interconnecting said processor card assembly components, said processor card PCB having a straight bevelled edge and a multiplicity of surface contacts on both sides of said processor card PCB adjacent to said beveled edge, said contacts being longitudinally evenly spaced along said edge for engagement with the contact arms;
and first and second actuators pivotally mounted on opposite corners of said processor card PCB away from said edge, each of said actuators being a class-two lever having a handle at one end and outwardly opening jaws at the other end, said actuators being manually rotatable between first and second positions, said jaws being adapted to engage the frame elements and move said processor card assembly; into engagement with the edge connectors upon rotation of said levers from said second positions to said first positions, and to extract said processor from engagement with the edge connectors upon engagement of said jaws with the frame elements and movement of said actuators from said second positions to said first positions.

15. A processor card assembly in accordance with claim 14 comprising:
said processor car PCB having a locating notch along said edge thereof adjacent said contacts for engagement with a key in one of the connectors to prevent longitudinal movement of said card relative to said connectors.

16. A processor card assembly in accordance with claim 15 wherein:
said levers are adapted to engage guide means located on the frame elements to present any lateral flexing of said processor card assembly PCB.

17. A processor card assembly for use in a personal computer system unit having a frame; a planar board mounted on the frame, the planar board including a planar board printed circuit board (PCB) having a plurality of planar board components mounted thereon and planar board circuit means electrically interconnecting the planar board components; the planar board components including a main memory for storing programs and data, I/O connector means adapted to be connected to I/O devices, I/O controller for controlling transference of information to and from the I/O devices, and channel expansion connector means; the planar board circuit means including a channel bus and a memory bus; the planar board component means further including two processor card edge connectors connected to the channel bus and the memory bus, the edge connectors including a multiplicity of springlike contact arms arranged in two opposing rows separated by a gap of predetermined width, the contact arms in each row being biased towards the arms in the other row, the contact arms in each row being longitudinally evenly spaced along such row, each connector having a laterally extending locating key in the middle of said row therein; the processor card assembly comprising:
a processor card PCB having mounted thereon a plurality of processor card components, said plurality of processor card components consisting of a microprocessor, a memory controller, a ROM unit storing operating system routines, a bus controller, and a DMA controller;
said processor card PCB having printed circuits therein interconnecting said components mounted on said processor card PCB, said printed circuits terminating at edge contacts engageable with the contact arms in the processor card edge connectors, said edge contacts being adapted to carry data signal, address signals, miscellaneous signals, and ground lines between the processor card assembly and the planar board, said processor card PCB further having a straight edge along which said contacts are located in two rows located on opposite sides of said edge with the contacts in each row being evenly spaced, said edge having a first notch therein adapted to slidingly engage one of the keys of one of the edge connectors to longitudinally align said contacts with the contact arms, said edge having a second notch therein of a size adapted to clear the key in the other edge connector.

18. A processor card assembly in accordance with claim 17 wherein
said processor card assembly having an actuator mounted on said processor card PCB, said actuator being movable between first and second positions and having a first surface adapted to engage a fulcrum located on the frame to generate a first force for inserting said edge into the connectors, said first surface having a opening therein adapted to receive a guide located on the frame so as to prevent any lateral movement of said actuator and said processor card PCB when said edge is inserted into the connectors.

19. A processor card in accordance with claim 18 wherein said actuator is pivotally mounted on said second PCB for rotation about a first axis between first and second positions, said second PCB having a latch hole therein spaced radially from said first axis, and said actuator having a latch element thereon engageable in said latch hole to releasably engage said latch element when said actuator is in said second position.

* * * * *